US008446649B2

(12) United States Patent
Sakita et al.

(10) Patent No.: US 8,446,649 B2
(45) Date of Patent: May 21, 2013

(54) OPTICAL SCANNING APPARATUS AND IMAGE FORMING APPARATUS

(75) Inventors: Tomoaki Sakita, Kanagawa (JP); Fumiya Hisa, Kanagawa (JP); Toshiharu Orui, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 216 days.

(21) Appl. No.: 13/117,921

(22) Filed: May 27, 2011

(65) Prior Publication Data
US 2012/0113485 A1    May 10, 2012

(30) Foreign Application Priority Data

Nov. 10, 2010    (JP) ................................. 2010-252006

(51) Int. Cl.
*H04N 1/04*    (2006.01)
(52) U.S. Cl.
USPC .............. 358/475; 358/509; 358/1.2; 399/51; 347/243; 347/234; 382/317; 382/275
(58) Field of Classification Search
USPC ............. 358/474, 475, 509, 1.2, 409; 399/51; 347/243, 224, 234; 382/317, 254, 275, 274
See application file for complete search history.

(56) References Cited

U.S. PATENT DOCUMENTS

| 5,321,432 | A | * | 6/1994 | Ishikawa et al. | .............. 347/131 |
| 5,627,670 | A | * | 5/1997 | Minoura et al. | ........... 359/196.1 |
| 5,905,851 | A | * | 5/1999 | Morimoto et al. | .............. 358/1.4 |
| 5,965,869 | A | * | 10/1999 | Masuda et al. | ................ 250/205 |
| 6,429,956 | B2 | * | 8/2002 | Itabashi | ..................... 359/204.1 |
| 7,173,234 | B2 | * | 2/2007 | Hiromatsu | ................... 250/226 |
| 7,471,307 | B2 | * | 12/2008 | Iwamoto | ...................... 347/234 |
| 7,542,179 | B2 | * | 6/2009 | Iguchi | ........................... 358/474 |
| 7,719,559 | B2 | * | 5/2010 | Sobue | .......................... 347/236 |
| 2009/0190944 | A1 | | 7/2009 | Okada | |

FOREIGN PATENT DOCUMENTS

JP    2002-131662 A    5/2002
JP    2006-251242 A    9/2006

* cited by examiner

*Primary Examiner* — Negussie Worku
(74) *Attorney, Agent, or Firm* — Sughrue Mion, PLLC

(57) ABSTRACT

An optical scanning apparatus includes a light source, a rotating polygonal mirror, a scanning optical system, a detector, and a light emission controller. The light source includes plural light emitting elements. The rotating polygonal mirror is irradiated with light beams. While rotating, the rotating polygonal mirror reflects and deflects, in a deflecting direction, light beams emitted from light emitting elements in a first direction to propagate through one point in the deflecting direction substantially at the same time. The scanning optical system causes the reflected and deflected light beams to scan over an object. The detector detects the timing at which a light beam propagates through a detection point. When the light beams propagate through the detection point, the light emission controller causes light emitting elements in a row in the first direction other than light emitting elements at both ends of a projection plane to emit light.

3 Claims, 10 Drawing Sheets

US 8,446,649 B2

OPTICAL SCANNING APPARATUS AND IMAGE FORMING APPARATUS

CROSS-REFERENCE TO RELATED APPLICATIONS

This application is based on and claims priority under 35 USC 119 from Japanese Patent Application No. 2010-252006 filed Nov. 10, 2010.

BACKGROUND (i) Technical Field

The present invention relates to an optical scanning apparatus and an image forming apparatus.

(ii) Related Art

Some image forming apparatuses include an exposure unit that scans a photoconductor with a light beam to form an electrostatic latent image. The exposure unit includes a light source, a rotating polygonal mirror, and an optical sensor. The light source includes plural light emitting elements arranged in a two-dimensional array, and each of the light emitting elements emits a light beam. The rotating polygonal mirror reflects and deflects the light beams while rotating. The optical sensor detects the deflected light beams at a specific position within a deflection range. The scanning operation is based on a signal from the optical sensor, and the emission of a light beam in accordance with an image signal is started.

SUMMARY

According to an aspect of the invention, there is provided an optical scanning apparatus including a light source, a rotating polygonal mirror, a scanning optical system, a detector, and a light emission controller. The light source includes plural light emitting elements each emitting a light beam modulated in accordance with an image signal, and the plural light emitting elements are arranged two-dimensionally in a first direction and a second direction intersecting the first direction. The rotating polygonal mirror is irradiated with plural light beams that are emitted from the light source and that are arranged two-dimensionally. While rotating, the rotating polygonal mirror reflects and deflects, in a deflecting direction according to an angle of rotation, plural light beams emitted from plural light emitting elements arranged in the first direction so that the plural light beams propagate through one point in the deflecting direction substantially at the same time. The scanning optical system directs the plural light beams reflected and deflected by the rotating polygonal mirror to an object to be scanned, and causes the plural light beams to scan over the object to be scanned. The detector detects a propagation timing at which a light beam propagates through a detection point. The detection point is located within an area where the rotating polygonal mirror deflects the light beams, and is located outside a scan area used for scanning of the object to be scanned. At a time when the plural light beams propagate through the detection point, the light emission controller causes only plural light emitting elements, which are arranged in a row in the first direction among inner light emitting elements other than light emitting elements located at both ends of a projection plane, to emit light. The projection plane is a plane obtained when the plural light emitting elements arranged two-dimensionally are projected in a direction perpendicular to the first direction in a two-dimensional plane where the plural light emitting elements are arranged two-dimensionally.

BRIEF DESCRIPTION OF THE DRAWINGS

Exemplary embodiment(s) of the present invention will be described in detail based on the following figures, wherein.

DETAILED DESCRIPTION

Exemplary embodiments of the present invention will be described hereinafter.

Figure 1:
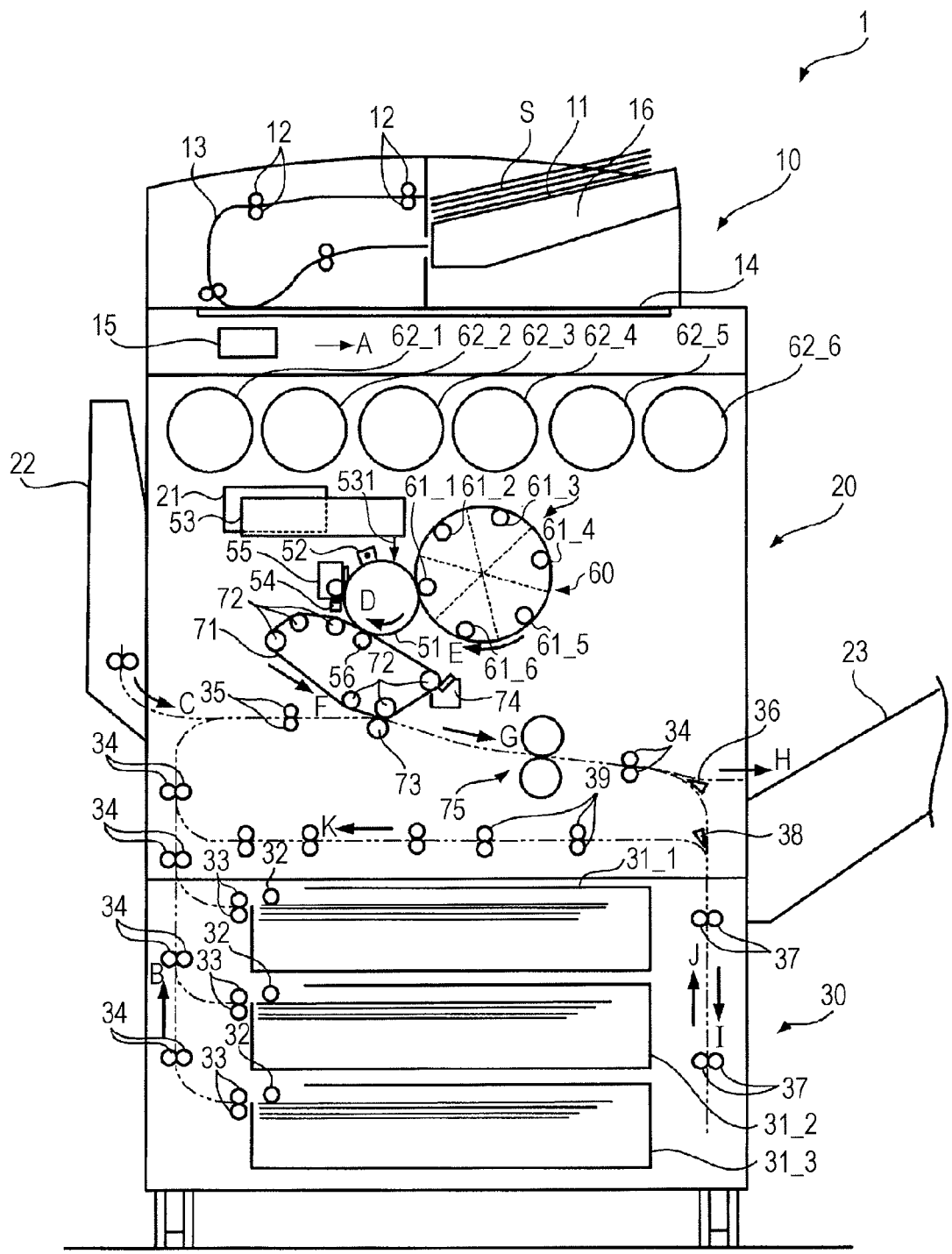
FIG. 1 is a schematic diagram of an image forming apparatus according to an exemplary embodiment of the present invention.

FIG. 1 is a schematic diagram of an image forming apparatus 1 according to an exemplary embodiment of the present invention. The image forming apparatus 1 illustrated in FIG. 1 includes an exposure unit 53. The exposure unit 53 may be an optical scanning apparatus according to an exemplary embodiment of the present invention.

The image forming apparatus 1 includes a document reading unit 10, an image forming unit 20, and a paper container unit 30.

The document reading unit 10 includes a document feeder tray 11 on which documents S are placed in a stacked manner. The documents S placed on the document feeder tray 11 are fed one by one, and are transported along a transport path 13 by transport rollers 12. A document reading optical system 15 is located below a transparent document reading plate 14 made of glass. After the document reading optical system 15 reads text and an image recorded on a transported document, the document is discharged to a document discharge tray 16.

The document reading unit 10 has a horizontally extending hinge on the far side thereof, and allows users to integrally lift the document feeder tray 11 and the document discharge tray 16 up about the hinge as the center of rotation. When the document feeder tray 11 and the document discharge tray 16 are lifted up, the document reading plate 14 appears. In the document reading unit 10, instead of placing documents on the document feeder tray 11, users may place one document with the print side facing down on the document reading plate 14. Then, the document reading optical system 15 may move in the direction of the arrow A to read text and an image on the document placed on the document reading plate 14.

An image signal obtained by the document reading optical system 15 is input to a processing/control circuit 21. The processing/control circuit 21 forms an image based on the input image signal in the following way. The processing/ control circuit 21 also controls the operation of the individual units of the image forming apparatus 1.

The paper container unit 30 provided in a lower portion of the image forming apparatus 1 includes three paper feeders 31_1, 31_2, and 31_3. The paper feeders 31_1, 31_2, and 31_3 contain sheets of paper P so that, for example, each of the paper feeders 31_1, 31_2, and 31_3 contains a stack of sheets of paper P having a different size. The paper feeders 31_1, 31_2, and 31_3 are configured to be removable for the replenishment of paper P.

Paper P is fed by a pickup roller 32 from, among the three paper feeders 31_1, 31_2, and 31_3, for example, a paper feeder (for example, the paper feeder 31_3) containing paper P whose size matches the size of the document, and is separated sheet by sheet by a separation roller 33. The paper P is transported upward in the direction of the arrow B by transport rollers 34, and is further transported after the transport timing of the paper P has been adjusted by a standby roller 35. The transport after the standby roller 35 will be described below.

The image forming unit 20 further includes a manual paper feeder tray 22. The manual paper feeder tray 22 may be foldable about the lower end portion thereof. Users may open the manual paper feeder tray 22 and place paper on the manual paper feeder tray 22, so that the paper placed on the manual paper feeder tray 22 may be fed in the direction of the arrow C.

The image forming unit 20 includes a photoconductor 51 in a center portion thereof, and the photoconductor 51 rotates in the direction indicated by the arrow D. A charging unit 52, a developing device 60, a charge erasing unit 54, and a cleaner 55 are arranged around the photoconductor 51. The exposure unit 53 is arranged above the photoconductor 51. A transfer unit 56 is placed at a position where an intermediate transfer belt 71 described below is held between the transfer unit 56 and the photoconductor 51.

The photoconductor 51 has a cylindrical shape. The photoconductor 51 is charged to store electric charge, and is exposed to light to discharge the electric charge. Thus, an electrostatic latent image is formed on the surface of the photoconductor 51.

The charging unit 52 charges the surface of the photoconductor 51 to a certain charging potential.

The exposure unit 53 receives an image signal from the processing/control circuit 21, and outputs a light beam 531 that has been modulated in accordance with the received image signal. The portion charged by the charging unit 52 on the surface of the photoconductor 51 rotating in the direction of the arrow D is repeatedly scanned with the light beam 531 along the rotational axis of the photoconductor 51 (in the direction perpendicular to the plane of FIG. 1), and an electrostatic latent image is formed on the surface of the photoconductor 51. An electrostatic latent image formed on the surface of the photoconductor 51 by scanning the photoconductor 51 with the light beam 531 is developed by the developing device 60, and a toner image is formed on the surface of the photoconductor 51. The developing device 60 includes six developing units 61_1, 61_2, 61_3, 61_4, 61_5, and 61_6. The developing device 60 rotates in the direction of the arrow E so that one developing unit (in FIG. 1, the developing unit 61_1) among the six developing units 61_1 to 61_6 moves to a position facing the photoconductor 51. The electrostatic latent image formed on the photoconductor 51 is developed by the developing unit facing the photoconductor 51 (here, the developing unit 61_1), and a toner image is formed.

The six developing units 61_1 to 61_6 provided in the developing device 60 contain toners of yellow (Y), magenta (M), cyan (C), and black (K) and further toners of two spot colors according to the user application, and each developing unit contains one of them. In the development of an electrostatic latent image on the photoconductor 51, the developing unit containing the toner of the color to be used is rotated to the position facing the photoconductor 51, and the developing unit facing the photoconductor 51 develops the electrostatic latent image using the toner of the color contained in the developing unit. Examples of the spot colors according to the user application include transparent toner which may be used to obtain a glossy image, and toner whose color is adjusted to a color that the user frequently uses.

Six toner tanks 62_1 to 62_6 containing the same color toners that are identical to the color toners used in the six developing units 61_1 to 61_6, respectively, are located above the developing device 60. As the toners in the developing units 61_1 to 61_6 are consumed, new toners are supplied from the toner tanks 62_1 to 62_6 containing the corresponding color toners to the developing units 61_1 to 61_6, respectively.

The toner images formed on the photoconductor 51 through the developing operation of the developing units 61_1 to 61_6 are transferred onto the intermediate transfer belt 71 by using the transfer unit 56.

After the transfer operation, the photoconductor 51 undergoes charge erasure by the charge erasing unit 54. Then, the cleaner 55 removes toner remaining on the photoconductor 51 after the transfer operation.

The intermediate transfer belt 71 may be an endless belt that is stretched over plural rollers 72 and that circulates in the direction of the arrow F. A transfer unit 73 is located near the intermediate transfer belt 71 at a position where the transport path of the paper P is held between the transfer unit 73 and one of the rollers 72. Further, a cleaner 74 that removes toner remaining on the intermediate transfer belt 71 after the transfer operation of the transfer unit 73 is located downstream of the transfer unit 73 in the circulation direction of the intermediate transfer belt 71. The transfer unit 73 and the cleaner 74 are configured to freely come into contact with or separate from the intermediate transfer belt 71. When an image of plural colors is to be formed, the transfer unit 73 and the cleaner 74 are separated from the intermediate transfer belt 71. Then, the operation of forming a toner image on the photoconductor 51 using toner of one certain color and transferring the toner image onto the intermediate transfer belt 71 is repeated a number of times corresponding to the plural developing units (toners of the plural colors) with the developing device 60 being rotated. Thus, the plural toner images of the toners of the plural colors are transferred onto the intermediate transfer belt 71 so as to be superimposed on one another.

After that, the transfer unit 73 is brought into contact with the intermediate transfer belt 71. The paper P is fed by the standby roller 35 so that when the superimposed toner images of the plural colors reach a transfer position where the transfer unit 73 is arranged, the paper P also reaches the transfer position. At the transfer position, the toner images of the plural colors on the intermediate transfer belt 71 are transferred onto the paper P by using the transfer unit 73. The paper P onto which the toner images have been transferred is further transported in the direction indicated by the arrow G, and is heated and pressed by a fixing unit 75 to fix the toner images. An image formed of the fixed toner images is formed on the paper P. The paper P that has passed the fixing unit 75 is further transported in the direction indicated by the arrow H, and is discharged to a paper discharge tray 23.

The cleaner 74 also moves so as to come into contact with the intermediate transfer belt 71. After the transfer operation of the transfer unit 73, the cleaner 74 removes toner remaining on the intermediate transfer belt 71 from the intermediate transfer belt 71.

The image forming apparatus 1 may also be an apparatus capable of forming images on both sides of paper P. When images are to be formed on both sides of paper P, paper P obtained after an image has been formed on a first side of the paper P in the way described above is not discharged to the paper discharge tray 23 but is fed to a guide member 36 to change the direction of the paper P, and is transported in the direction indicated by the arrow I by a transport roller 37. After that, the transport direction is reversed, and a guide member 38 allows the paper P to be transported in the direction indicated by the arrow K by transport rollers 39 to reach the standby roller 35.

After that, an image is formed on a second side of the paper P in a manner similar to that described above. The paper P with the images formed on both sides thereof is discharged to the paper discharge tray 23.

Figure 2:
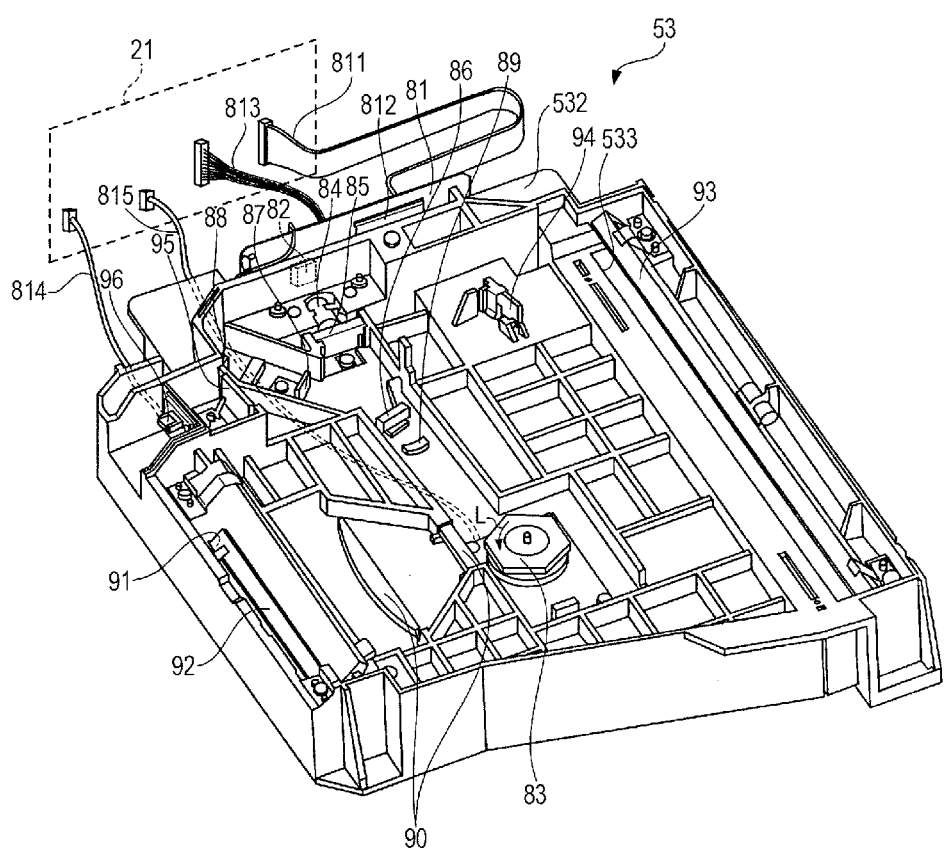
FIG. 2 is a perspective view of an exposure unit.

FIG. 2 is a perspective view of the exposure unit 53.

In the illustration of FIG. 2, the exposure unit 53 is uncovered and internal components of the exposure unit 53 appear.

A circuit board 81 is fixed to a housing 532 of the exposure unit 53, and a surface emitting laser diode 82 is mounted on the circuit board 81. An image signal cable 811 and a power supply/adjustment control signal cable 813 are further connected to the circuit board 81, and a drive circuit 812 is also mounted on the circuit board 81. The laser diode 82 mounted on the circuit board 81 may be a laser diode of the type that emits plural light beams, and the exposure unit 53 scans the photoconductor 51 illustrated in FIG. 1 with the plural light beams substantially at the same time.

The image signal cable 811 and the power supply/adjustment control signal cable 813 serve to transmit an image signal, electric power, and various adjustment control signals from the processing/control circuit 21 to the circuit board 81. The image signal transmitted to the circuit board 81 through the image signal cable 811 is processed by the drive circuit 812, and is converted into a driving signal for controlling the light beams emitted from the laser diode 82 for exposure. The driving signal is then transmitted to the laser diode 82. In response to the transmitted driving signal, the laser diode 82 emits plural light beams. Further, the electric power transmitted through the power supply/adjustment control signal cable 813 is used to operate the circuit board 81 and to drive the laser diode 82. The adjustment control signals transmitted through the power supply/adjustment control signal cable 813 are used to allow the drive circuit 812 to drive the laser diode 82 to adjust the amount of light. In addition to the image signal cable 811 and the power supply/adjustment control signal cable 813, a timing-signal cable 814 for transmitting a scan start timing signal and a motor driving cable 815 for controlling a motor of the exposure unit 53 are also connected between the exposure unit 53 and the processing/control circuit 21.

An optical system including a rotating polygonal mirror 83 and plural other optical members is arranged in the housing 532 of the exposure unit 53.

Figure 3:
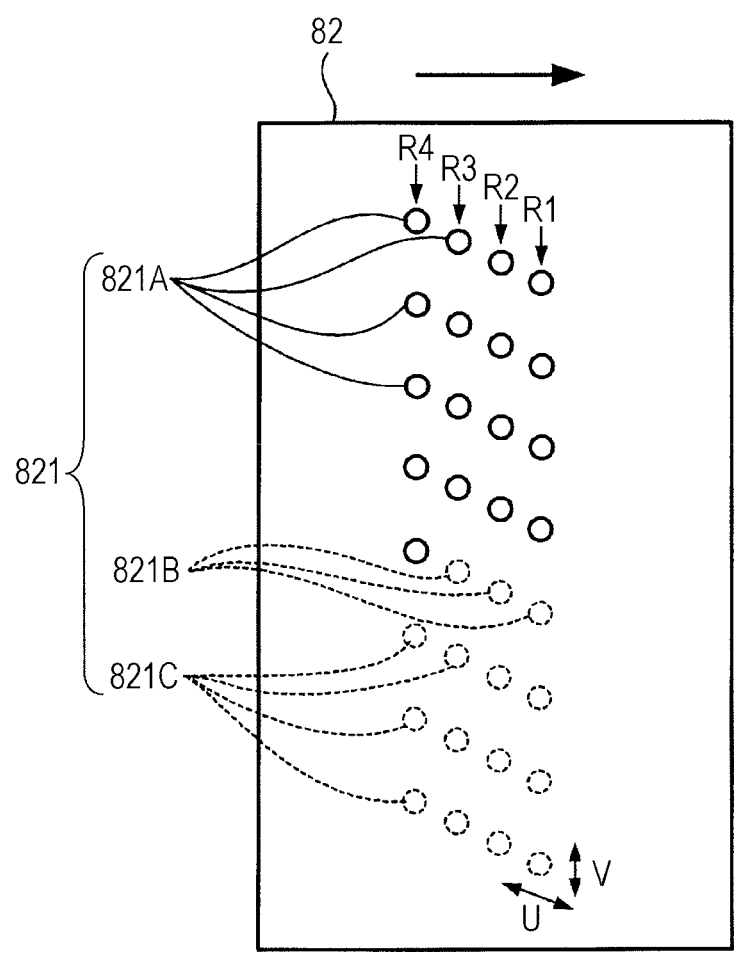
FIG. 3 illustrates the arrangement of light emitting elements in a laser diode illustrated in FIG. 2.

FIG. 3 illustrates the arrangement of light emitting elements in the laser diode 82 illustrated in FIG. 2.

The laser diode 82 includes a two-dimensional array of 32 light emitting elements 821. The 32 light emitting elements 821 are arranged two-dimensionally in a first direction V and a second direction U intersecting the first direction V. More specifically, the 32 light emitting elements 821 are arranged in such a manner that four rows of eight light emitting elements arranged side by side in the first direction V are arranged side by side in the second direction U. The four rows are a first row R1 arranged at the right end in FIG. 2, a second row R2, a third row R3, and a fourth row R4 at the left end. Each of the light emitting elements 821 may be a vertical cavity-surface emitting laser (VCSEL) light emitting element, and emits a light beam in a direction intersecting the surface of a substrate of the laser diode 82 on which the light emitting elements 821 are arranged.

The laser diode 82 according to this exemplary embodiment has 32 light emitting elements 821. Among the 32 light emitting elements 821, 17 light emitting elements 821A indicated by solid lines are arranged in the upper portion of FIG. 3, and emit light beams in accordance with image signals. The other 15 light emitting elements 821B and 821C arranged in the lower portion of FIG. 3 do not emit light beams in accordance with image signals. More specifically, the image signal cable 811 (FIG. 2) has plural core wires along which image signals corresponding to light emitting elements are transmitted from the processing/control circuit 21 to the circuit board 81. However, among the 15 light emitting elements 821B and 821C described above, the 12 light emitting elements 821C arranged in the lower portion of FIG. 3 are not allocated core wires, and no signals are transmitted to the image signal cable 811 (FIG. 2). Similarly to the 17 light emitting elements 821A arranged in the upper portion of FIG. 3, among the 15 light emitting elements 821B and 821C, the three light emitting elements 821B arranged on the upper side are allocated core wires for transmitting signals to the image signal cable 811 (see FIG. 2). However, only signals for adjustment during manufacturing are transmitted but image signals are not transmitted through the core wires. The three light emitting elements 821B emit light beams together with the 17 light emitting elements 821A indicated by the solid lines only during the adjustment of an optical path when the exposure unit 53 is manufactured.

In other words, among the 32 light emitting elements 821, the 17 light emitting elements 821A arranged in the upper portion of FIG. 3 emit light beams in accordance with image signals. Here, the 17 light emitting elements 821A correspond to an example of "plural light emitting elements each emitting a light beam modulated in accordance with an image signal" according to an exemplary embodiment of the present invention.

Limiting the number of light emitting elements being used among the 32 light emitting elements 821 in the laser diode 82 reduces the range within which the light emitting elements are distributed. Further, the beam spot of each of the light beams emitted from light emitting elements 821 far from the center of the distribution of the light emitting elements through a lens and a mirror is spread over in a smaller area than that for the beam spot of, for example, each of the light beams emitted from the 32 light emitting elements dispersed over a wide range.

Figure 4:
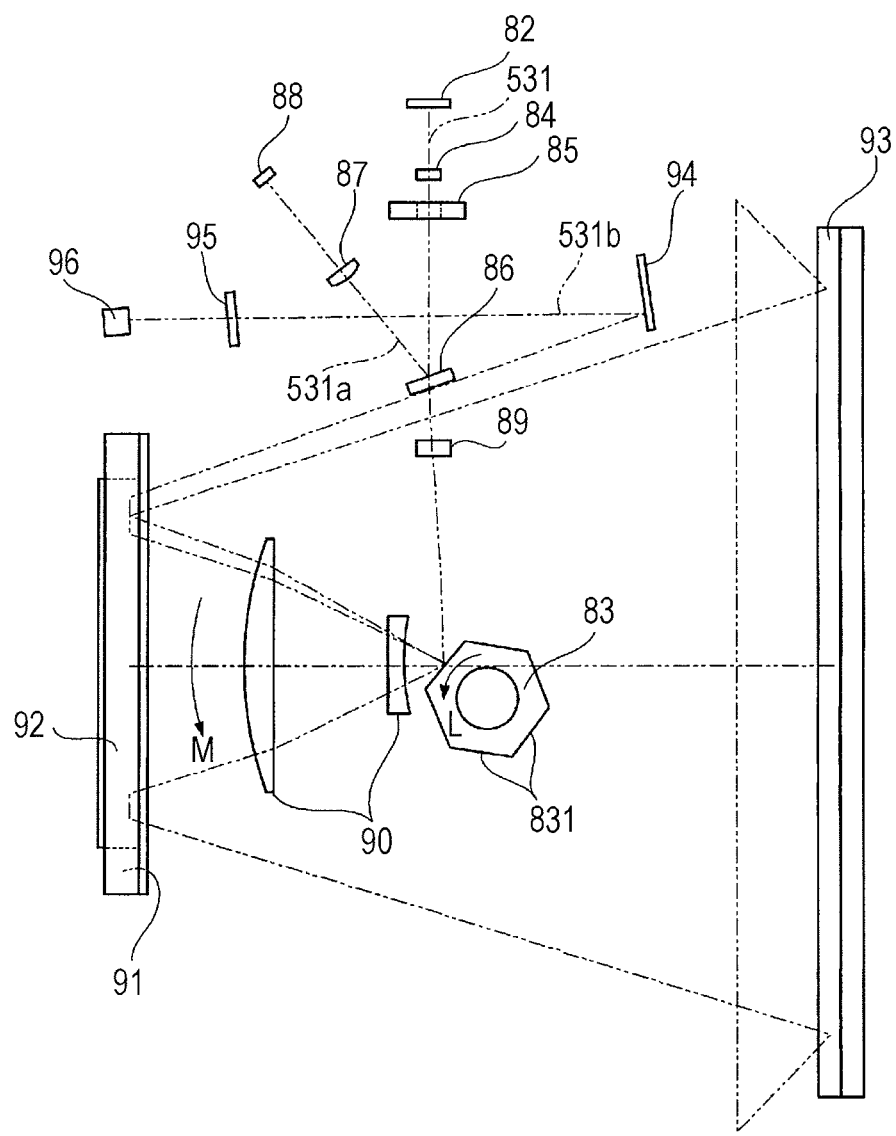
FIG. 4 is a plan view of an optical system arranged in a housing of the exposure unit.
Figure 5:
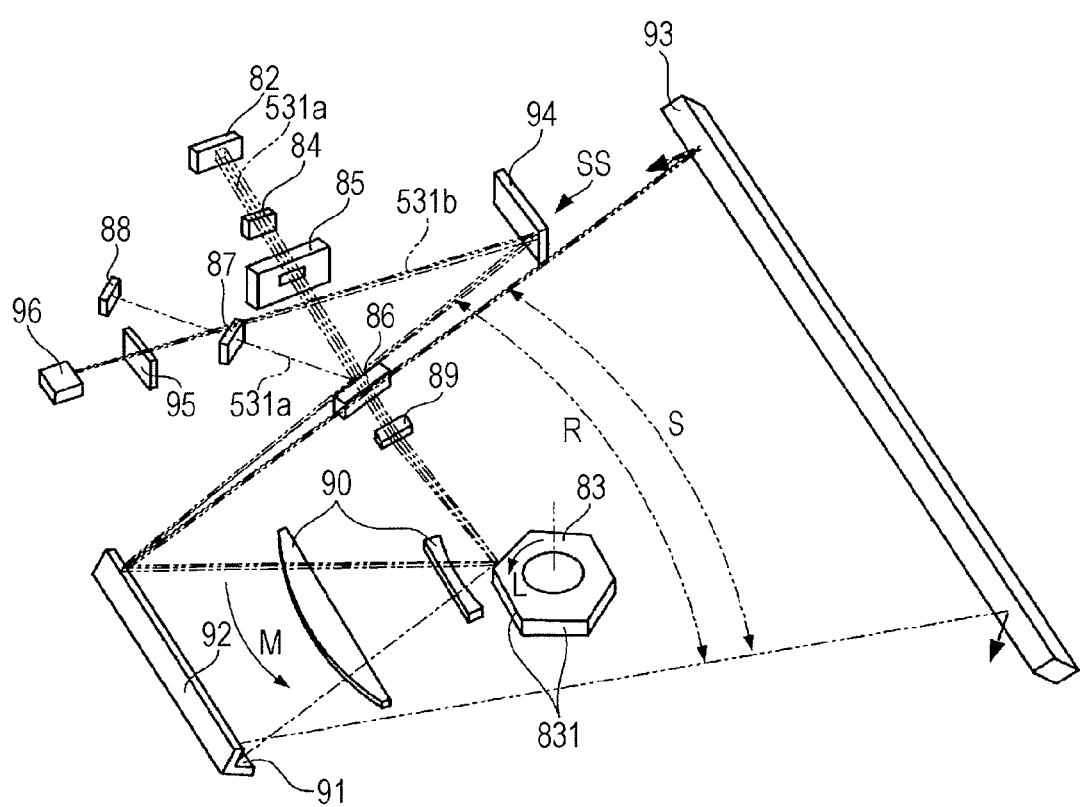
FIG. 5 is a perspective view of the optical system arranged in the housing of the exposure unit.

FIGS. 4 and 5 are a plan view and a perspective view, respectively, of an optical system provided in a housing of the exposure unit 53 illustrated in FIG. 2.

The plural light beams 531 emitted from the laser diode 82 are transmitted through a collimator lens 84 and an aperture 85, and reach a half mirror 86. The half mirror 86 reflects some of the incident beams and reflected beams 531a are input to an optical sensor 88 for detecting an amount of light through a condenser lens 87. Light receiving signals obtained by the optical sensor 88 are transmitted to the circuit board 81 illustrated in FIG. 2, and the drive circuit 812 on the circuit board 81 adjusts the amount of light of the light beams to be emitted from the laser diode 82 in accordance with the received signals. In FIG. 5, the light beams emitted from the laser diode 82 are indicated by plural lines, whereas, in FIG. 4, the light beams are simply indicated by a single line for convenience of simplification.

The plural light beams transmitted through the half mirror 86 reach the rotating polygonal mirror (polygon mirror) 83 through a cylindrical lens 89. The rotating polygonal mirror 83 has reflecting mirrors on peripheral surfaces 831 thereof, and reflects the incident beams in a deflecting direction which corresponds to the angle of rotation. The rotating polygonal mirror 83 rotates in the direction of the arrow L, and the reflected beams are repeatedly deflected in the deflecting direction indicated by the arrow M.

As illustrated in FIG. 3, the light emitting elements 821 of the laser diode 82 are arranged two-dimensionally in the first direction V and the second direction U, and the first direction V is a direction extending along the rotational axis of the rotating polygonal mirror 83 that rotates. Therefore, the rotating polygonal mirror 83 is deflected in the direction in which, among the light emitting elements 821A, plural light beams emitted from plural light emitting elements arranged in the first direction V, that is, plural light emitting elements arranged in a certain row among the four rows R1, R2, R3, and R4 extending in the first direction V, propagate through one point in the deflecting direction substantially at the same time. The deflection of the rotating polygonal mirror 83 allows the light beams from the light emitting elements arranged in the first row R1 on the rightmost side among the light emitting elements 821A illustrated in FIG. 3 to propagate through the point, and then allows the light beams from the light emitting elements arranged in the left adjacent, second row R2 to propagate through the point. Further, the light beams from the light emitting elements arranged in the left adjacent third row R3 and the light beams from the light emitting elements arranged in the fourth row R4 are allowed to sequentially propagate through the point.

The light beams reflected by the rotating polygonal mirror 83 propagate through an f-theta (fθ) lens 90, and are reflected upward by a cylindrical mirror 91 to propagate upward, and is reflected by a plane mirror 92 in a direction in which the optical path returns. The light beams reflected by the plane mirror 92 propagate above the fθ lens 90 and the rotating polygonal mirror 83 and are reflected downward by the cylindrical mirror 93. Then, the light beams are emitted down the housing 532 through an opening 533 (see FIG. 2) formed in the housing 532. As illustrated in FIG. 1, the light beams 531 emitted from the housing 532 of the exposure unit 53 scan the photoconductor 51 along the rotational axis of the photoconductor 51 to form an electrostatic latent image on the photoconductor 51.

Each of the fθ lens 90, the cylindrical mirror 91, the plane mirror 92, and the cylindrical mirror 93 corresponds to an example of a scanning optical system according to an exemplary embodiment of the invention.

A reflecting mirror 94 is arranged at a detection point SS that is within a range R where the rotating polygonal mirror 83 deflects light beams (FIG. 5) and that is outside a scan area S that is used for the scanning of the photoconductor 51. The light beams reflected by the plane mirror 92 are reflected by the reflecting mirror 94 at the single scan start timing. Reflected beams 531b reflected by the reflecting mirror 94 propagate through the condenser lens 95 and enter the timing-detection optical sensor 96.

The timing-detection optical sensor 96 detects the scan start timing of the light beams in the scan area S in accordance with the rotation of the rotating polygonal mirror 83 in order to adjust the light beam emission timing based on image signals. Light receiving signals obtained by the timing-detection optical sensor 96 are transmitted to the processing/control circuit 21 through the timing-signal cable 814 illustrated in FIG. 2. The processing/control circuit 21 generates timing-adjusted image signals based on the light receiving signals, and transmits the timing-adjusted image signals to the circuit board 81. Accordingly, the light beams 531 whose amounts of light have been adjusted in accordance with the light receiving signals of the optical sensor 88 and that have been modulated in accordance with the image signals whose timings have been adjusted in accordance with the light receiving signals of the optical sensor 96 are emitted from the laser diode 82.

Figure 6:
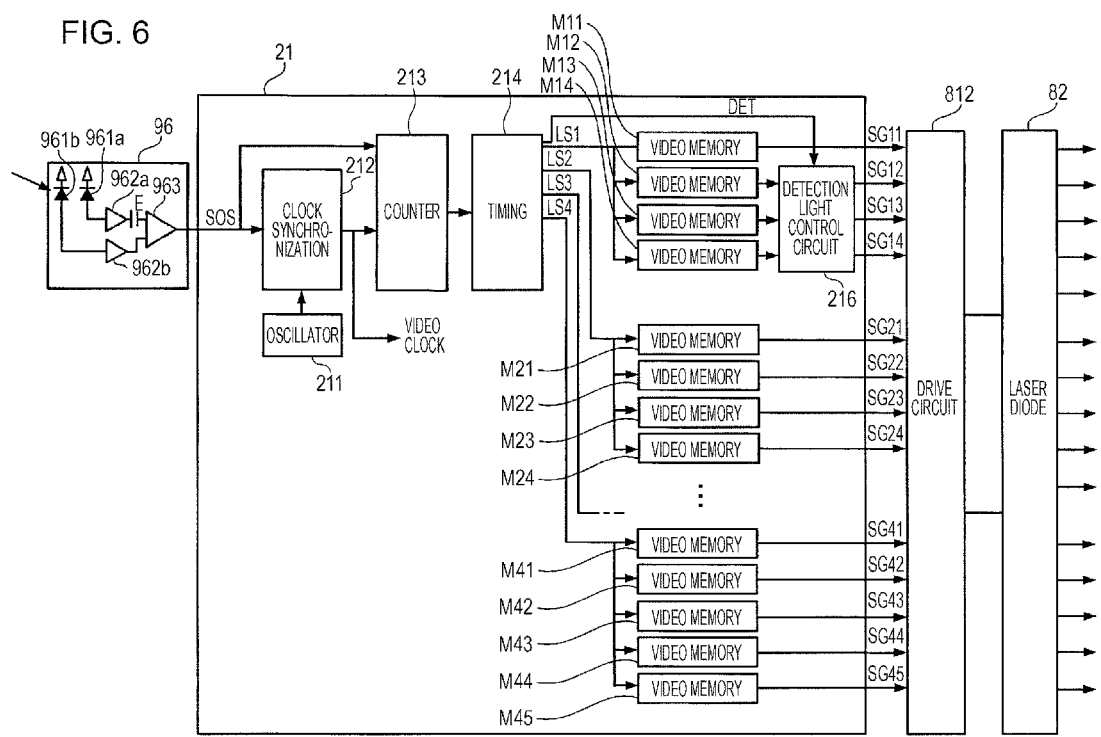
FIG. 6 is a block diagram illustrating the configuration of a drive circuit and a processing/control circuit that are adapted to cause the laser diode to emit light beams.

FIG. 6 is a block diagram illustrating the configuration of the drive circuit 812 and the processing/control circuit 21 that cause the laser diode 82 to emit a light beam. In FIG. 6, in addition to the processing/control circuit 21 and the drive circuit 812, the laser diode 82 and the timing-detection optical sensor 96 are also illustrated.

The timing-detection optical sensor 96 includes two photodiode 961a and 961b (hereinafter also referred to as the "first photodiode 961a" and the "second photodiode 961b") through which electric currents corresponding to the amounts of incident light flow, two amplifiers 962a and 962b that convert the electric currents in the photodiodes 961a and 961b into voltages and that amplify the voltages, and a comparator 963 that compares the amplified voltages of the two signals. A bias voltage E is applied to the output of the amplifier 962a out of the two amplifiers 962a and 962b.

Figure 7A:
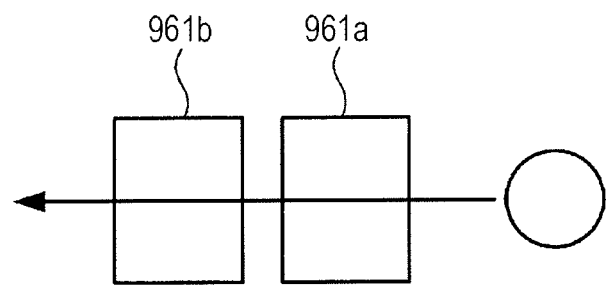
FIGS. 7A and 7B illustrate photodiodes of a timing-detection optical sensor and signal waveforms, respectively.
Figure 7B:
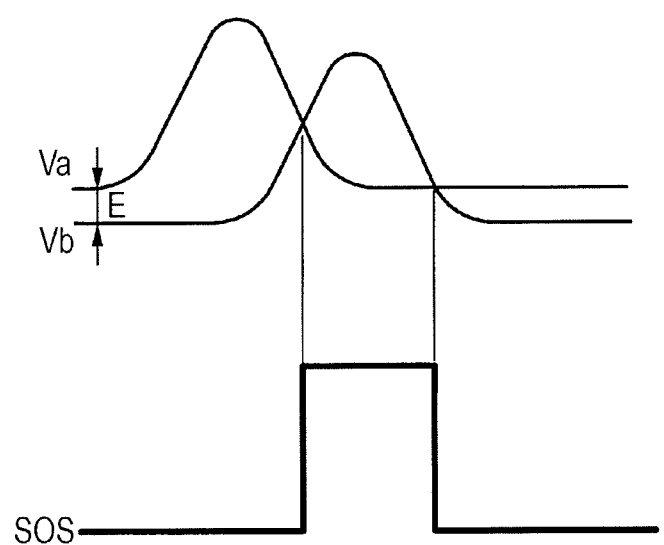

FIGS. 7A and 7B illustrate the photodiodes 61a and 961b of the timing-detection optical sensor 96 and signal waveforms, respectively. FIG. 7A illustrates the arrangement of the two photodiodes 961a and 961b, and FIG. 7B illustrates the waveforms of the output voltages Va and Vb from the two amplifiers 962a and 962b and the waveform of a signal SOS representing the output of the comparator 963.

The two photodiodes 961a and 961b are arranged adjacent to each other, and are arranged side by side in the direction in which light beams propagate in accordance with the rotation of the rotating polygonal mirror 83. When propagating through the timing-detection optical sensor 96, the light beams propagate above the first photodiode 961a, and then propagates above the second photodiode 961b. In this case, as illustrated in FIG. 7B, the output voltages Va and Vb from the amplifiers 962a and 962b sequentially exhibit peaks. The comparator 963 outputs a signal SOS that is a start timing signal when the output voltage Vb of the amplifier 962b corresponding to the second photodiode 961b exceeds the output voltage Va of the amplifier 962a corresponding to the first photodiode 961a. The bias voltage E (see FIG. 6) may prevent the state of the signal SOS from being unstable due to noise or the like if either of the two photodiodes 961a and 961b does not receive light.

The timing-detection optical sensor 96 outputs a start timing signal SOS from the comparator 963 at the timing at which the light beams move from the first photodiode 961a to the second photodiode 961b. That is, the start timing signal SOS represents the timing at which the light beams propagate through the detection point SS (see FIG. 5), in other words, the single scan start timing. Here, the accuracy of the timing at which the timing-detection optical sensor 96 outputs the start timing signal SOS may be affected by the curve of the waveforms of the output voltages Va and Vb of the amplifiers 962a and 962b, that is, by the curve of changes in amount of light received by the two photodiodes 961a and 961b.

Referring back to FIG. 6, the processing/control circuit 21 includes an oscillator 211, a clock synchronization circuit 212, a counter circuit 213, a timing circuit 214, video memories M11 to M14, M21 to 24, M31 to 34, and M41 to M45 (hereinafter referred to as the "video memories M11 to M45"), and a detection light control circuit 216. The video memories M31 to 34 are not illustrated in FIG. 6.

The clock synchronization circuit 212 receives the start timing signal SOS from the timing-detection optical sensor 96 and a clock signal generated by the oscillator 211. The clock synchronization circuit 212 outputs a video clock signal synchronized with the start timing signal SOS. The counter circuit 213 counts the number of video clocks from the reception of the start timing signal SOS, and outputs a count signal representing the elapsed time since the reception of the start timing signal SOS.

The timing circuit 214 outputs read permission signals LS1 to LS4 representing the lapse of predetermined read permission times to the rows R1 to R4 of the light emitting elements 821, respectively, in accordance with the count signal. The timing circuit 214 also outputs a detection-light timing signal DET to emit timing-detection light for obtaining the start timing signal SOS subsequent to the start timing signal SOS for causing counting to be started.

The 17 video memories M11 to M45 are provided so as to correspond to the 17 light emitting elements 821A illustrated in FIG. 3. Each of the video memories M11 to M45 may be first-in first-out (FIFO) memories, and stores data for causing a corresponding one of the light emitting elements 821A to emit a light beam based on the data of an image to be formed by the exposure unit 53. Data is read from the video memories M11 to M45 in accordance with the timing of the read permission signals LS1 to LS4 from the timing circuit 214, and is output as image signals SG11 to SG14, SG21 to SG24, SG31 to SG34, and SG41 to SG45 (hereinafter referred to as the "image signals SG11 to SG45").

The drive circuit 812 drives the light emitting elements 821A (see FIG. 3) of the laser diode 82 in accordance with the image signals SG11 to SG45. Consequently, the light emitting elements 821A emit light beams that have been modulated in accordance with the image signals SG11 to SG45. The image signals SG11 to SG14 correspond to the four light emitting elements in the first row R1 among the 17 light emitting elements 821A arranged in the upper portion of FIG. 3, indicated by the solid lines, in descending order from the top. The image signals SG21 to SG24 correspond to the four light emitting elements in the second row R2 in descending order from the top. The image signals SG31 to SG34 (not illustrated) correspond to the four light emitting elements in the third row R3 in descending order from the top. The image signals SG41 to SG45 correspond to the five light emitting elements in the fourth row R4 in descending order from the top.

The detection light control circuit 216 outputs signals for emitting light for detecting the scan start timing in accordance with the detection-light timing signal DET. The signals are output from the processing/control circuit 21 so as to be superimposed on the image signals SG12 to SG14, and are supplied only to the light emitting elements corresponding to the image signals SG12 to SG14.

Here, the timing-detection optical sensor 96 corresponds to an example of a detector according to an exemplary embodiment of the present invention, and the processing/control circuit 21 corresponds to an example of a light emission controller according to an exemplary embodiment of the present invention.

Figure 8:
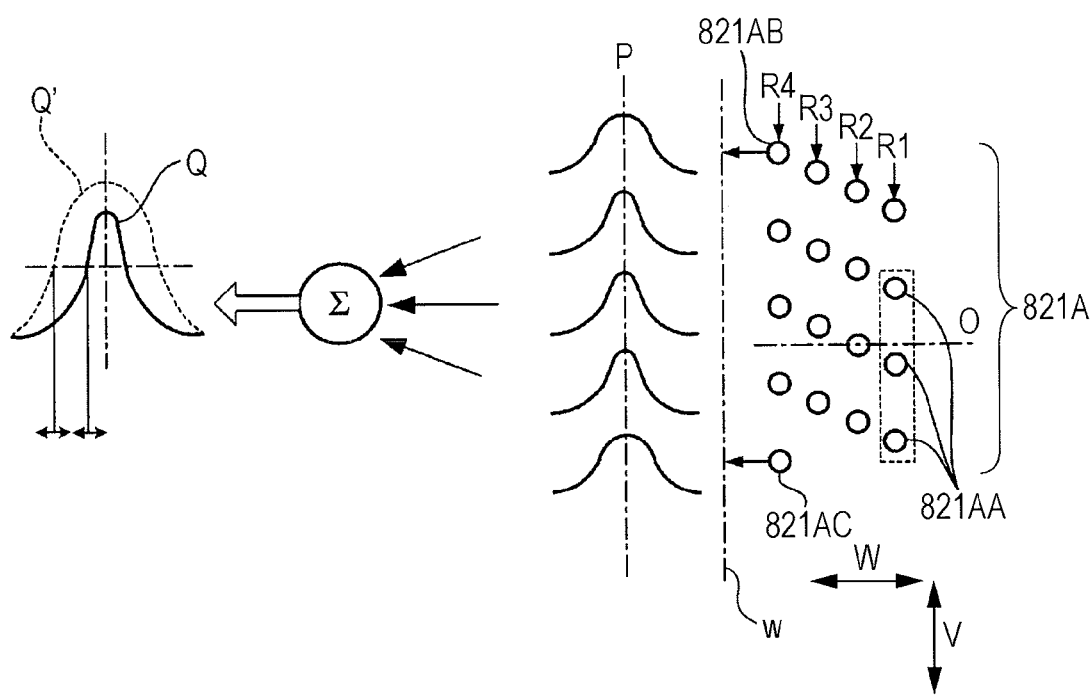
FIG. 8 illustrates light emitting elements driven in accordance with image signals among the light emitting elements illustrated in FIG. 3, and the amounts of light of incident light beams.

FIG. 8 illustrates light emitting elements to be driven in accordance with image signals among the light emitting elements illustrated in FIG. 3, and also illustrates the amounts of light of the incident light beams. In FIG. 8, the amount of light incident upon the second photodiode 961b among the two photodiodes 961a and 961b illustrated in FIG. 7A is represented as an amount of light incident upon the timing-detection optical sensor 96 (see FIG. 6).

The 17 light emitting elements 821A illustrated in FIG. 8 emit light beams corresponding to the image signals SG11 to SG45 from the processing/control circuit 21 illustrated in FIG. 6. At the time when light beams propagate through the detection point SS (see FIG. 5), the detection light control circuit 216 of the processing/control circuit 21 causes only some of the 17 light emitting elements 821A that emit light beams in accordance with image signals to emit light. Specifically, among the 17 light emitting elements 821A, plural light emitting elements in a row in the first direction V among inner light emitting elements, i.e., light emitting elements other than light emitting elements 821AB and 821AC at both ends of a projection plane w are caused to emit light. The projection plane w is projected in a direction W perpendicular to (i.e., forming a right angle with) the first direction V in the plane of the two-dimensional array. In the row, the plural successive light emitting elements are caused to emit light. Here, the detection light control circuit 216 (FIG. 6) of the processing/control circuit 21 causes only three light emitting elements 821AA arranged in the first row R1, among the inner light emitting elements other than the light emitting elements 821AB and 821AC at both ends of the projection plane w in the 17 light emitting elements 821A, to emit light. That is, at the time when the light beams propagate through the detection point SS (see FIG. 5), the three light beams emitted from the three light emitting elements 821AA enter the timing-detection optical sensor 96, and the start timing signal SOS is output in accordance with the amounts of light of the three light beams.

The 17 light emitting elements 821A illustrated in FIG. 8 are distributed in the first direction V over both sides of the optical axes of the collimator lens 84 and cylindrical lens 89 illustrated in FIGS. 4 and 5 and over both sides of a center position O in the rotational axis direction of each of the peripheral surfaces 831 of the rotating polygonal mirror 83 (hereinafter referred to as a "center position O"). Here, a light beam emitted from the light emitting element 821AB located at an end of the projection plane w far from the center position O propagates through the edges of the respective lenses, which are far from the optical axes thereof, resulting in a large aberration. Thus, the beam spot of the light beam incident upon the timing-detection optical sensor 96 through the rotating polygonal mirror 83 and the individual lenses may be spread over a larger area than when the light beams are emitted from the inner light emitting elements. This similarly applies to the light beam emitted from the light emitting element 821AC at the opposite end of the projection plane w. The spread of the beam spots also occurs in the light beam deflecting direction. Therefore, the changes in the amounts of light in the timing-detection optical sensor 96 obtained when the light beams emitted from the light emitting elements 821AB and 821AC at both ends propagate across the timing-detection optical sensor 96 due to the their deflection may be slower than those in the light beams emitted from the individual inner light emitting elements.

The graph in the left part of FIG. 8 represents an example of changes in amount of light P obtained when a light beam emitted from one of the light emitting elements 821A propagates through the timing-detection optical sensor 96. In FIG.

8, changes in the amount of light P of the light beams emitted from the five light emitting elements arranged in the fourth row R4 are illustrated by way of example. The light beams emitted from the light emitting elements 821AB and 821AC at both ends far from the center position O change more slowly than the light beams emitted from the other light emitting elements.

The actual amount of light received by the timing-detection optical sensor 96, more specifically, light received by each of the photodiodes 961 and 961b illustrated in FIG. 7A is equal to the sum (Σ) of the amounts of light of the emitted light beams. In this exemplary embodiment, the processing/control circuit 21 causes only plural light emitting elements in a row in the first direction V, among the inner light emitting elements other than the light emitting elements 821AB and 821AC at both ends of the projection plane w, to emit light. More specifically, the three light emitting elements 821AA in the first row R1 are caused to emit light.

Therefore, light beams whose amounts of light change relatively slowly may not enter the timing-detection optical sensor 96, and changes Q in the amount of light received by the timing-detection optical sensor 96 may be more rapid than changes Q' in the amount of light obtained when, for example, light beams are emitted from the light emitting elements in the fourth row R4 including the light emitting elements 821AB and 821AC at both ends. Thus, variations of the detection accuracy of the timing at which the light beams propagate through the timing-detection optical sensor 96 due to the variations in the sensitivity of a photodiode or due to external noise may be small. Consequently, the detection accuracy of the timing at which the light beams propagate through the timing-detection optical sensor 96 may be higher than that when the light emitting elements 821AB and 821AC are also caused to emit light beams.

Furthermore, since the light beams emitted from the light emitting elements 821AA in the first row R1, which first propagate through the timing-detection optical sensor 96, may be used among the four rows R1 to R4, the start timing signal SOS may be detected more quickly than when the light beams emitted from the light emitting elements in any other row are used. Thus, thereafter, a longer processing time may be maintained.

In this exemplary embodiment, furthermore, the processing/control circuit 21 may cause the three successive light emitting elements 821AA in the first row R1 to emit light. For example, aberration of each of the light beams emitted from the light emitting elements 821AA may cause the beam spot to be spread over a smaller area than when light emitting elements that are not caused to emit light are arranged between three light emitting elements that are caused to emit light. Therefore, the amount of light required to detect the timing at which the light beams propagate through the timing-detection optical sensor 96 may be obtained without reducing the detection accuracy of the propagation timing.

In this exemplary embodiment, furthermore, the processing/control circuit 21 causes the light emitting elements 821AA arranged in the first row R1 among the four rows R1 to R4 to emit light so that the light beams that first propagate through one point in the deflecting direction are emitted. Therefore, the timing of detecting the start timing signal SOS may be earlier than that when light emitting elements arranged in the other rows are caused to emit light, and a larger number of processes may be executed until image signals are output.

Figure 9:
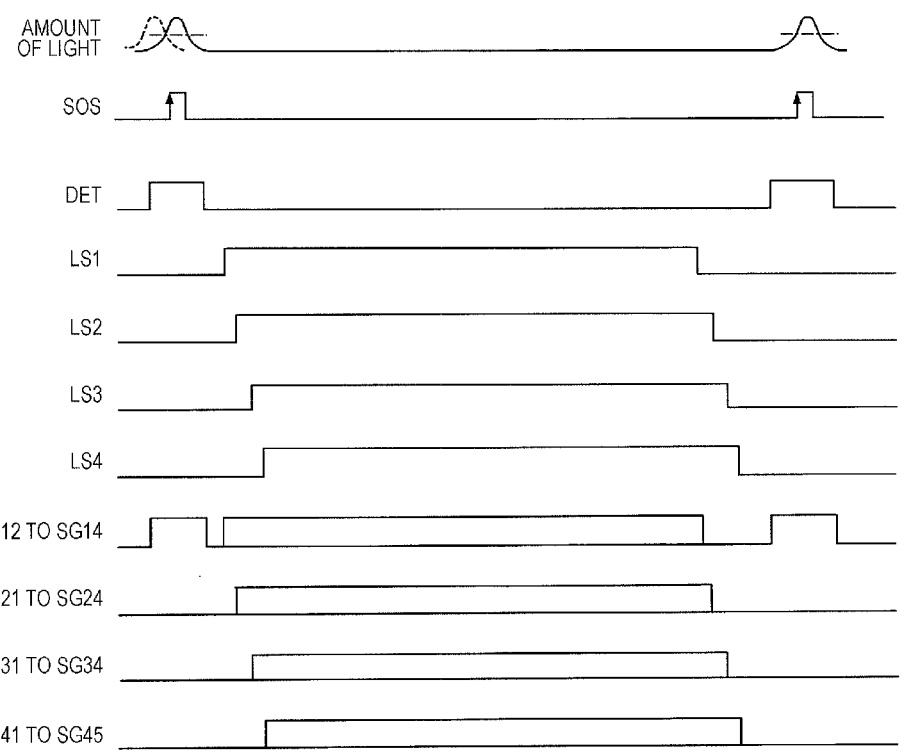
FIG. 9 is a time chart illustrating signals of the blocks illustrated in FIG. 6.

FIG. 9 is a time chart illustrating signals from the blocks illustrated in FIG. 6.

In FIG. 9, the amounts of light incident upon the photodiodes 961a and 961b of the timing-detection optical sensor 96 are illustrated at the top of the time chart. In FIG. 9, the amount of light received by the second photodiode 961b of the timing-detection optical sensor 96 is indicated by a solid line, and the amount of light received by the first photodiode 961a is indicated by a broken line. An amount of light increases when a light beam from a light emitting element propagates through the detection point at which the timing-detection optical sensor 96 is arranged, in accordance with the rotation of the rotating polygonal mirror 83. As described with reference to FIG. 7B, the start timing signal SOS is output when the output voltage Vb of the amplifier 962b corresponding to the second photodiode 961b exceeds the output voltage Va of the amplifier 962a corresponding to the first photodiode 961a. The start timing signal SOS represents the propagation timing at which light beams propagate through the detection point SS (see FIG. 5).

The detection-light timing signal DET and the read permission signals LS1 to LS4 are output on the basis of the start timing signal SOS. The detection-light timing signal DET is output on the basis of the start timing signal SOS for a period of time including the time when a light beam propagates through the detection point SS at the next scan. The timing at which the detection-light timing signal DET is output is obtained by counting the number of video clocks from the timing of the start timing signal SOS.

The read permission signals LS1 to LS4 are output in accordance with the timing at which the light beams corresponding to the rows R1 to R4 (see FIG. 8) propagate through the scan area S (see FIG. 5). The image signals SG11 to SG45 are generated so as to correspond to the read permission signals LS1 to LS4.

Accordingly, the image signals SG11 to SG45 are generated on the basis of the timing of the start timing signal SOS determined from the amount of light received by the timing-detection optical sensor 96. In this exemplary embodiment, the timing-detection optical sensor 96 receives the light beams from only the three light emitting elements 821AA (see FIG. 8) arranged in the first row R1, resulting in the detection accuracy of the start timing signal SOS being higher than that when light beams are received from light emitting elements including the light emitting elements 821AB and 821AC. Therefore, the detection accuracy of the timing at which the image signals SG11 to SG45 are output may be high, and the detection accuracy of the position of the photoconductor 51 irradiated with a light beam per scan may also be high.

In FIG. 9, the image signals SG12 to SG14, SG21 to SG24, SG31 to SG34, and SG41 to SG45 among the image signals SG11 to SG45 are illustrated. Light beams are emitted from the 17 light emitting elements 821A in accordance with the image signals SG11 to SG45. A signal for emitting a light beam for detecting the scan start timing is superimposed on the image signals SG12 to SG14 corresponding to the three light emitting elements 821AA among the image signals SG11 to SG45.

Modifications

An exemplary embodiment has been described. In modifications, light emitting elements that emit light beams for detecting the scan start timing are located at different positions from those in the exemplary embodiment. Such modifications will now be described. The following modifications are different from the foregoing exemplary embodiment in the positions of the light emitting elements that emit light beams for detecting the scan start timing and in the corresponding blocks. Other configuration is common to that in the foregoing exemplary embodiment and thus portions other than the different portions will be described with reference to the same numerals as those in the foregoing exemplary embodiment.

Figure 10:
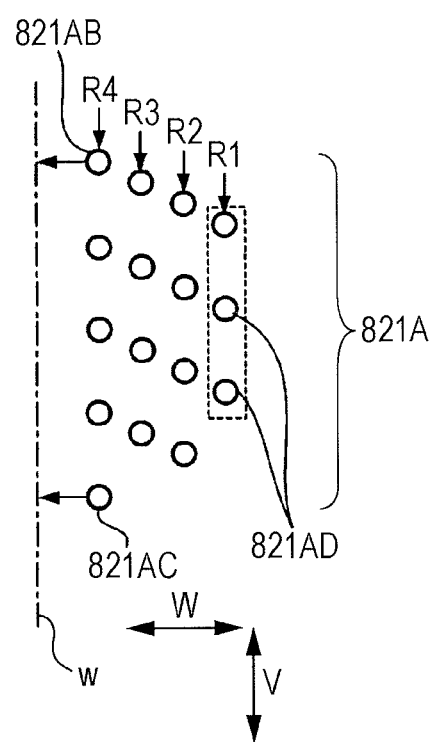
FIG. 10 illustrates the arrangement of light emitting elements according to a modification.

FIG. 10 illustrates the arrangement of light emitting elements in a modification.

In the arrangement of the light emitting elements 821A illustrated in FIG. 10, the positions of three light emitting elements 821AD that emit light beams for detecting the light scan start timing are shifted in the first row R1 by one light emitting element with respect to the positions of the three light emitting elements 821AA in the foregoing exemplary embodiment illustrated in FIG. 8.

Even in the modification illustrated in FIG. 10, the amount of light received by the timing-detection optical sensor 96 may change more rapidly than, for example, the amount of light obtained when the light emitting elements in the fourth row R4 including the light emitting elements 821AB and 821AC at both ends are caused to emit light beams. Therefore, the detection accuracy of the timing at which light beams propagate through the timing-detection optical sensor 96 may be higher than that when the light emitting elements 821AB and 821AC are also caused to emit light beams.

In the foregoing exemplary embodiment, "plural light emitting elements each emitting a light beam image signal modulated in accordance with an image signal" according to an exemplary embodiment of the present invention have been described in the context of the 17 light emitting elements 821A among the 32 light emitting elements provided in the laser diode 82, by way of example. However, the present invention is not limited to this exemplary embodiment. For example, the number of light emitting elements each emitting a light beam modulated in accordance with an image signal may be any number other than 17, or all the light emitting elements provided in the laser diode 82 may be used.

In the foregoing exemplary embodiment, furthermore, a light emission controller according to an exemplary embodiment of the present invention has been described in the context of the processing/control circuit 21 that causes three light emitting elements to emit light at the time when light beams propagate through the detection point SS, by way of example. However, the present invention is not limited to this exemplary embodiment. The number of light emitting elements that emit light at the time when light beams propagate through the detection point SS may be any number as long as a light beam that is detectable by the detector (timing-detection optical sensor 96) when propagating through the detection point SS may be emitted. If the detector detects the light beams, for example, two light emitting elements may be used, or more than three light emitting elements may be used in accordance with the size of light emitting elements used for image formation and the performance of the detector.

In the foregoing exemplary embodiment, furthermore, light emitting elements that are caused to emit light at the time when light beams propagate through the detection point SS have been described in the context of the light emitting elements 821AA arranged in the first row R1, by way of example. However, the present invention is not limited to the foregoing exemplary embodiment, and light emitting elements arranged in the second and subsequent rows may be caused to emit light at the time when propagating through the detection point SS. Note that the light emitting elements 821AA in the first row R1 allow the propagation timing to be more quickly detected than when light emitting elements in the other rows are used.

In the foregoing exemplary embodiment, furthermore, a detector according to an exemplary embodiment of the present invention has been described in the context of the timing-detection optical sensor 96 that includes the two photodiodes 961a and 961b and that outputs a start timing signal SOS from the result of comparison of the corresponding signals, by way of example. However, the detector according to an exemplary embodiment of the present invention is not limited to the timing-detection optical sensor 96, and, for example, a detector of the type that includes a single photodiode and that compares an output signal with a predetermined reference level may be used.

In the foregoing exemplary embodiment, furthermore, an image forming apparatus according to an exemplary embodiment of the present invention has been described in the context of the image forming apparatus 1 that includes the six developing units 61_1 to 61_6 and the single photoconductor 51, by way of example. However, an image forming apparatus according to an exemplary embodiment of the present invention is not limited to the image forming apparatus 1. For example, a so-called tandem apparatus or an apparatus dedicated to the formation of monochrome images may be used.

In the foregoing exemplary embodiment, furthermore, the image forming apparatus 1 including the document reading unit 10 is used as an example of an image forming apparatus. However, an image forming apparatus according to an exemplary embodiment of the present invention may be, for example, a printer or a facsimile machine.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical scanning apparatus comprising:
   a light source including a plurality of light emitting elements each emitting a light beam modulated in accordance with an image signal, the plurality of light emitting elements being arranged two-dimensionally in a first direction and a second direction intersecting the first direction;
   a rotating polygonal mirror that is irradiated with a plurality of light beams emitted from the light source, the plurality of light beams being arranged two-dimensionally, and that, while rotating, reflects and deflects, in a deflecting direction according to an angle of rotation, a plurality of light beams emitted from a plurality of light emitting elements arranged in the first direction so that the plurality of light beams propagate through one point in the deflecting direction substantially at the same time;
   a scanning optical system that directs the plurality of light beams reflected and deflected by the rotating polygonal mirror to an object to be scanned and that causes the plurality of light beams to scan over the object to be scanned;
   a detector that detects a propagation timing at which a light beam propagates through a detection point, the detection point being located within an area where the rotating polygonal mirror deflects the light beams and being located outside a scan area used for scanning of the object to be scanned; and a light emission controller that, at a time when the plurality of light beams propagate through the detection point, causes only a plurality of light emitting elements to emit light, the plurality of light emitting elements being arranged in a row in the first direction among inner light emitting elements other than light emitting elements located at both ends of a projection plane, the projection plane being a plane obtained when the plurality of light emitting elements arranged two-dimensionally are projected in a direction perpendicular to the first direction in a two-dimensional plane where the plurality of light emitting elements are arranged two-dimensionally.

2. The optical scanning apparatus according to claim 1, wherein the light emission controller causes a plurality of successive light emitting elements arranged in a row in the first direction to emit light, the plurality of successive light emitting elements being a plurality of light emitting elements other than light emitting elements located at both ends of the projection plane.

3. An image forming apparatus comprising:
- a photoconductor on which a latent image is formed by exposing the photoconductor to light; and
- an exposure unit that scans the photoconductor with a light beam modulated in accordance with an image signal to expose the photoconductor with light to form a latent image on the photoconductor,
- the exposure unit including
  - a light source including a plurality of light emitting elements each emitting a light beam modulated in accordance with an image signal, the plurality of light emitting elements being arranged two-dimensionally in a first direction and a second direction intersecting the first direction,
  - a rotating polygonal mirror that is irradiated with a plurality of light beams emitted from the light source, the plurality of light beams being arranged two-dimensionally, and that, while rotating, reflects and deflects, in a deflecting direction according to an angle of rotation, a plurality of light beams emitted from a plurality of light emitting elements arranged in the first direction so that the plurality of light beams propagate through one point in the deflecting direction substantially at the same time,
  - a scanning optical system that directs the plurality of light beams reflected and deflected by the rotating polygonal mirror to an object to be scanned and that causes the plurality of light beams to scan over the object to be scanned,
  - a detector that detects a propagation timing at which a light beam propagates through a detection point, the detection point being located within an area where the rotating polygonal mirror deflects the light beams and being located outside a scan area used for scanning of the object to be scanned, and
  - a light emission controller that, at a time when the plurality of light beams propagate through the detection point, causes only a plurality of light emitting elements to emit light, the plurality of light emitting elements being arranged in a row in the first direction among inner light emitting elements other than light emitting elements located at both ends of a projection plane, the projection plane being a plane obtained when the plurality of light emitting elements arranged two-dimensionally are projected in a direction perpendicular to the first direction in a two-dimensional plane where the plurality of light emitting elements are arranged two-dimensionally.

* * * * *